(12) United States Patent
Fukase (10) Patent No.: US 7,735,393 B2
(45) Date of Patent: Jun. 15, 2010

(54) BRAKE PEDAL APPARATUS

(75) Inventor: Akihiko Fukase, Toyota (JP)

(73) Assignee: Toyoda Iron Works Co., Ltd., Toyota-shi, Aichi-ken (JP)

( * ) Notice: Subject to any disclaimer, the term of this patent is extended or adjusted under 35 U.S.C. 154(b) by 375 days.

(21) Appl. No.: 11/484,671

(22) Filed: Jul. 12, 2006

(65) Prior Publication Data

US 2007/0277640 A1    Dec. 6, 2007

(30) Foreign Application Priority Data

Jun. 5, 2006    (JP) .............................. 2006-155860

(51) Int. Cl.
    *G05G 1/30*    (2008.04)
(52) U.S. Cl. .............................. 74/512; 74/513; 74/560
(58) Field of Classification Search ........... 74/512–514, 74/560, 516, 575; 188/357
    See application file for complete search history.

(56) References Cited

U.S. PATENT DOCUMENTS

| | | | | |
|---|---|---|---|---|
| 2,706,020 | A | * | 4/1955 | Freers et al. ................. 188/357 |
| 2,755,891 | A | * | 7/1956 | Levell et al. ................. 188/357 |
| 3,063,427 | A | | 10/1962 | Hill |
| 3,633,366 | A | | 1/1972 | Cripe |
| 3,988,945 | A | * | 11/1976 | Fasano ......................... 74/512 |
| 4,005,617 | A | | 2/1977 | Sourbel et al. |
| 5,161,657 | A | | 11/1992 | Papenhagen et al. |
| 6,666,105 | B2 | | 12/2003 | Wachi |
| 6,782,775 | B2 | * | 8/2004 | Hayashihara ................. 74/512 |
| 7,069,810 | B2 | * | 7/2006 | Hayashihara ................. 74/512 |
| 7,448,296 | B2 | * | 11/2008 | Fukase ......................... 74/516 |
| 7,614,320 | B2 | * | 11/2009 | Fukase ......................... 74/512 |
| 2002/0088303 | A1 | * | 7/2002 | Hayashihara et al. ......... 74/560 |
| 2003/0106392 | A1 | | 6/2003 | Willemsen |
| 2004/0129106 | A1 | * | 7/2004 | Prat et al. ..................... 74/512 |
| 2006/0169092 | A1 | * | 8/2006 | Prat Terradas et al. ........ 74/512 |
| 2007/0221009 | A1 | * | 9/2007 | Fujiwara ..................... 74/512 |

FOREIGN PATENT DOCUMENTS

| | | |
|---|---|---|
| DE | 25 16 659 | 10/1975 |
| DE | 196 02 620 A1 | 1/1996 |

(Continued)

*Primary Examiner*—Vinh T. Luong
(74) *Attorney, Agent, or Firm*—Finnegan, Henderson, Farabow, Garrett & Dunner, LLP (57) ABSTRACT

A brake pedal apparatus including: (a) an operating pedal disposed pivotably about a first axis; (b) a pivot member disposed pivotably about a second axis and connected to the operating pedal via a link mechanism so as to be pivoted about the second axis in response to a depressing operation of the operating pedal; and (c) an output member for receiving an output generated by pivot motion of the pivot member. The link mechanism includes (i) a first connecting link connecting the operating pedal and the pivot member with first play, and (ii) a second connecting link connecting the operating pedal and the pivot member with second play. In a first region before a characteristic switching point of a pedal stroke of the operating pedal, the pivot member is pivoted through the first connecting link, while a lever ratio is changed according to a first lever ratio characteristic. In a second region beyond the characteristic switching point, the pivot member is pivoted through the second connecting link, while the lever ratio is changed according to a second lever ratio characteristic.

9 Claims, 6 Drawing Sheets

FOREIGN PATENT DOCUMENTS

| | | |
|---|---|---|
| EP | 1 712 440 A1 | 10/2006 |
| EP | 1 724 170 A2 | 11/2006 |
| JP | 51-31340 | 9/1976 |
| JP | 53-16236 | 2/1978 |
| JP | 7-205776 | 8/1995 |
| JP | 10-29510 | 2/1998 |
| JP | 2000-127926 | 5/2000 |
| JP | 2002-347590 | 12/2002 |
| WO | WO 02/067072 A1 * | 8/2002 |

* cited by examiner

FIG. 1

FIG. 2A
INITIAL POSITION

FIG. 2B
CHARACTERISTIC SWITCHING POINT

FIG. 3A
FIRST REGION $$RL1 = \frac{L}{R1} \times \frac{R2}{R3}$$

FIG. 3B
SECOND REGION $$RL2 = \frac{L}{r1} \times \frac{r2}{r3}$$

FIG. 3C

LEVER RATIO CHARACTERISTIC

FIG. 6A
INITIAL POSITION

FIG. 6B
CHARACTERISTIC SWITCHING POINT

BRAKE PEDAL APPARATUS

This application is based on Japanese Patent Application No. 2006-155860, the content of which is incorporated hereinto by reference.

BACKGROUND OF THE INVENTION

1. Field of the Invention

The present invention relates in general to a brake pedal apparatus, and more particularly to such a brake pedal apparatus having a high degree of freedom in setting of a lever ratio characteristic.

2. Discussion of Prior Art

There is known a brake pedal apparatus having (a) an operating pedal which is disposed pivotably about a first axis, (b) a pivot member which is disposed pivotably about a second axis parallel to the first axis, and which is connected to the operating pedal via a link mechanism so as to be mechanically pivoted about the second axis in response to a depressing operation effected on the operating pedal; and (c) an output member which is to be mechanically pressed or pulled as a result of pivot motion of the pivot member. As an example of such a brake pedal apparatus, Patent Document 1 discloses an apparatus in which a lever ratio representative of a ratio of an output to a depression force acting on the operating pedal is changed in accordance with a pedal stroke.

Patent Document 1: JP-H7-205776A
Patent Document 2: JP-H10-29510A

However, in such a conventional brake pedal apparatus, since a characteristic of change of the lever ratio (lever ratio characteristic) is dependent on connected positions of the link mechanism, it is difficult to largely change the lever ratio halfway during the pedal stroke. Thus, the change in the lever ratio is not necessarily satisfactory.

Patent Document 2 discloses a technique of largely changing the lever ratio characteristic by changing a path for transmission of the depression force. According to an arrangement disclosed by this document, in a normal case, the depression force is transmitted from the operating pedal to an input rod of a brake booster via an elastic member. When the depression force applied to the operating pedal is increased, for example, in the event of failure of the brake booster, the depression force is transmitted from the operating pedal directly to the input rod of the brake booster. However, the disclosed arrangement is for changing the lever ratio characteristic in accordance with the depression force, rather than for largely changing the lever ratio in accordance with the pedal stroke during a normal operation of the operating pedal. Further, since the elastic member is arranged to receive the depression force at its portion that is offset from the input rod of the brake booster, the input rod can be easily stuck, thereby causing a risk of deterioration in efficiency of transmission of the depression force and durability of the brake pedal apparatus.

The present invention was made in the light of the background art discussed above. It is therefore an object of the invention to provide a brake pedal apparatus which is capable of changing the lever ratio by a large amount halfway during the pedal stroke without considerable deterioration in the efficiency of transmission of the depression force and the durability of the apparatus, and which has a high degree of freedom in setting of the lever ratio characteristic.

SUMMARY OF THE INVENTION

For achieving the above object, the first invention provides a brake pedal apparatus having: (a) an operating pedal which is disposed pivotably about a first axis; (b) a pivot member which is disposed pivotably about a second axis parallel to the first axis, and which is connected to the operating pedal via a link mechanism so as to be mechanically pivoted about the second axis in response to a depressing operation effected on the operating pedal; and (c) an output member which is to be mechanically pressed or pulled as a result of pivot motion of the pivot member, the brake pedal apparatus is characterized in that: (d) the link mechanism has a pair of first and second connecting links connecting the operating pedal and the pivot member with play; (e) in a first region before a predetermined characteristic switching point of a pedal stroke of the operating pedal, the pivot member is pivoted through via the first connecting link, and a lever ratio is changed according to a lever ratio characteristic 1 that is dependent on connected positions of the first connecting link; and in a second region beyond the predetermined characteristic switching point of the pedal stroke, the pivot member is pivoted through the second connecting link, and the lever ratio is changed according to a lever ratio characteristic 2 that is dependent on a connected position of the second connecting link.

The second invention is, in the brake pedal apparatus of the first invention, characterized in that (a) the first and second connecting links are connected to the operating pedal and the pivot member at a total of four connected positions that are set individually from each other, and in that (b) an elongated hole is provided in one of connecting portions of the operating pedal and the pivot member at which the operating pedal and the pivot member are connected to each of the first and second connecting links, such that the elongated hole provides the play.

In the brake pedal apparatus, in the first region before the characteristic switching point, the pivot member is pivoted through the first connecting link whereby the lever ratio is changed according to the lever ratio characteristic 1. On the other hand, in the second region beyond the characteristic switching point, the pivot member is pivoted through the second connecting link whereby the lever ratio is changed according to the lever ratio characteristic 2. The lever ratio characteristics 1 and 2 can be set depending on the connected positions of the first and second connecting links and individually from each other. The characteristic switching point, at which the lever ratio characteristic is switched from the lever ratio characteristic 1 to the lever ratio characteristic 2, can be suitably set depending on the connected positions and the play of the first and second connecting links.

Thus, the lever ratio characteristic in the first region and that in the second region can be set independently of each other, and the characteristic switching point as a boundary of the first and second regions can be suitably set. It is therefore possible to incontinuously and largely change the lever ratio at an arbitrary position (characteristic switching point) of the pedal stroke, thereby improving a degree of freedom in setting of the lever ratio characteristic and providing a further excellent braking operation feeling. Further, the depression force is transmitted from the operating pedal to the pivot member through the first connecting link during the first region, and the depression force is transmitted from the operating pedal to the pivot member through the second connecting link during the second region, so that there is no risk of considerable deterioration in efficiency of transmission of the depression force and durability of the brake pedal apparatus, which deterioration would be caused in the event of the stuck due to the offset arrangement as in the above-described Patent Document 2.

In the second invention, the total of four connected positions at which the first and second connecting links are connected to the operating pedal and the pivot member are set individually from each other, so that the degree of freedom in setting of the lever ratio characteristics 1 and 2 is high. Further, since the play is established by the elongated hole that is provided in the connecting portion, each of the first and second connecting links is relatively movable within the elongated hole. The lever ratio characteristic is switched between the lever ratio characteristics 1 and 2, when the first or second connecting link reaches an end portion of the elongated hole. Thus, the switching of the lever ratio characteristic can be stably and smoothly made as the depressing operation of the operating pedal is effected.

The first and second regions are set, for example, to correspond to a first half and a second half of the entire pedal stroke, respectively. However, each of the first and second regions does not necessarily have to correspond to a half of the entire pedal stroke, but may be suitably set, for example, such that one of the first and second regions corresponds to about one-third or less of the entire pedal stroke. Further, the lever ratio in the second region may be either larger or smaller than that in the first region. The brake pedal apparatus may be constituted by any one of various arrangements such as an arrangement in which the pedal stroke reaches the second region only when the operating pedal is largely depressed, for example, in case of a so-called "panic brake", and the lever ratio is drastically increased or reduced in the second region.

The first and second connecting links may be are arranged to be parallel to each other, as seen in a front view perpendicular to the first and second axes, for example, in an initial state before a depressing operation is effected on the operating pedal. However, the first and second connecting links do not necessarily have to be parallel to each other. Further, the first and second connecting links may be arranged to intersect with each other, depending on the lever ratio characteristic 1 and the lever ratio characteristic 2.

Further, in addition to the first and second connecting links, a third connecting link may be provided to connect the operating pedal and the pivot member with certain play, so that the pedal stroke of the operating pedal is divided into three regions. According to this arrangement, in the first region, the pivot member is pivoted through the first connecting link in the first region whereby the lever ratio is changed according to the lever ratio characteristic 1, the pivot member is pivoted through the second connecting link in the second region whereby the lever ratio is changed according to the lever ratio characteristic 2, and the pivot member is pivoted through the third connecting link in a third region whereby the lever ratio is changed according to a lever ratio characteristic 3.

The total of four connected positions at which the first and second connecting links are connected to the operating pedal and the pivot member may be different from each other. However, one of the operating pedal and the pivot member may have a common connecting portion that provides both of the connecting portions of the one of the operating pedal and the pivot member at which the one of the operating pedal and the pivot member are connected to the respective first and second connecting links (through a common connecting pin, for example). In this case, the play may be provided in each of the connecting portions of the other of the operating pedal and the pivot member at which the other of the operating pedal and the pivot member are connected to the respective first and second connecting links.

In the second invention, the elongated hole providing the play is provided in one of the connecting portions of the operating pedal and the pivot member at which the operating pedal and the pivot member are connected to each of the first and second connecting links. However, the first invention may be carried out, for example, with an arrangement in which the elongated holes are provided in both of the operating pedal and the pivot member, or with an arrangement in which the play is provided by a cutout and/or an engaging protrusion. Further, the elongated hole providing the play may be provided in the first connecting link and/or the second connecting link, so that the play is provided by engagement of the elongated hole with a connecting pin that is provided in the operating pedal and/or the pivot member. The elongated hole may take any one of various shapes such as straight linear shape and arcuate shape.

The output member is provided by, for example, a rod of a brake booster that is to be pressed in response to a depressing operation effected on the operating pedal. However, the output member may be provided by a brake cable that is to be pulled in response to the depressing operation. Further, the present invention is applicable also to an electric brake system in which a braking force is controlled by electrically detecting load applied to the output member and displacement of the output member.

The brake pedal apparatus of the present invention is advantageously applied to a service braking system. However, the brake pedal apparatus can be applied to a parking braking system, too.

BRIEF DESCRIPTION OF THE DRAWINGS

FIGS. 2A and 2B are views showing in enlargement a link mechanism portion of the embodiment of FIG. 1, wherein FIG. 2A shows a state in which the operating pedal is in its initial position, while

FIGS. 3A-3C are views explaining a lever ratio characteristic of the embodiment of FIG. 1, wherein FIG. 3A explains a lever ratio RL1 in a first region, FIG. 3B explains a lever ratio RL2 in a second region.

DETAILED DESCRIPTION OF THE INVENTION

There will be described in detail embodiments of the present invention, with reference to the drawings.

Figure 1:
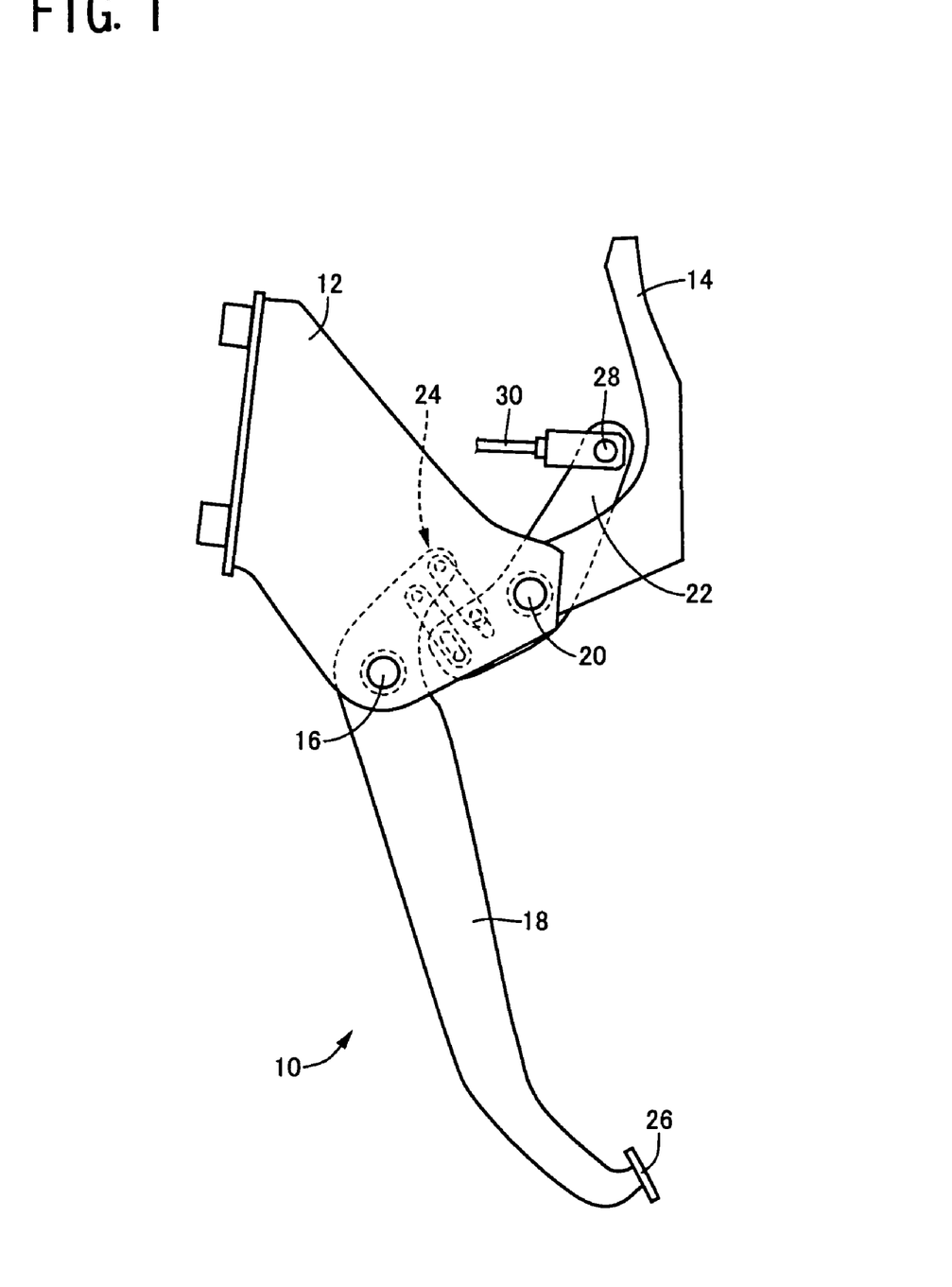
FIG. 1 is a front view schematically showing a brake pedal apparatus as an embodiment of the present invention.

FIG. 1 is a front view schematically showing an embodiment of the invention in the form of a brake pedal apparatus 10 that is to be used for a service braking system of a vehicle. The front view of FIG. 1 shows the brake pedal apparatus 10 as installed on the vehicle, and is a view as seen in a lateral direction of the vehicle. This brake pedal apparatus 10 is provided in brackets 12, 14 that are integrally fixed to a body of the vehicle. An operating pedal 18 is provided in the bracket 12, so as to be pivotable about an axis of a first support shaft 16 that is substantially horizontal. The brackets 12, 14 are connected through a second support shaft 20 on which a pivot member 22 is mounted to be pivotable about an axis of the second support shaft 20. A link mechanism 24 is provided to bridge between the operating pedal 18 and the pivot member 22. The first and second support shafts 16, 20 are held in parallel to each other, and the axes of the first and second support shafts 16, 20 correspond to a first axis and a second axis, respectively.

The operating pedal 18, when a pedal pad 26 provided in its lower end portion is depressed by a driver of the vehicle, is pivoted clockwise about the first support shaft 16 as seen in FIG. 1, thereby causing the pivot member 22 to be mechanically pivoted counterclockwise about the second support shaft 20, through the link mechanism 24 that is connected to an upper end portion of the operating pedal 18. A rod 30 of a brake booster is connected to an upper end portion of the pivot member 22, so as to be pivotable relative to the pivot member 22 about an axis of a connecting pin 28 that is parallel to the second support shaft 20. As a result of the pivot motion of the pivot member 22, the rod 30 is mechanically pressed leftward as seen in FIG. 1, and pushes a push rod of a master cylinder (not shown), for generating a hydraulic brake pressure. The rod 30 is biased to project outwardly of the brake booster. Therefore, when the pedal pad 26 is released from the depressing operation effected thereon, the biasing force of the rod 30 causes the pivot member 22 to be pivoted back clockwise about the second support shaft 20, and the operating pedal 18 to be pivoted back counterclockwise about the first support shaft 16 so as to be held in its initial position as shown in FIG. 1. It is noted that the rod 30 corresponds to an output member.

Figure 2A:
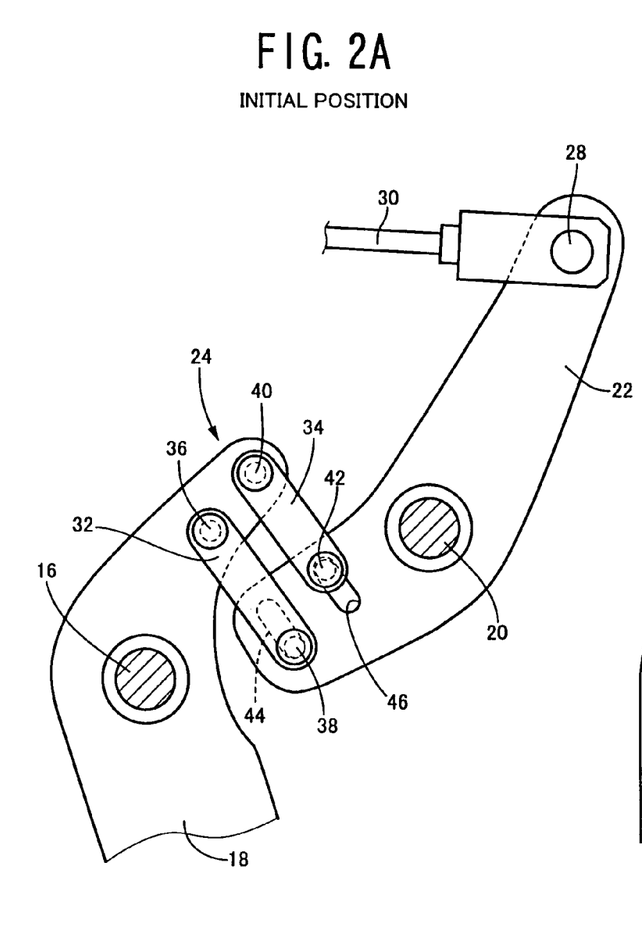
Figure 2B:
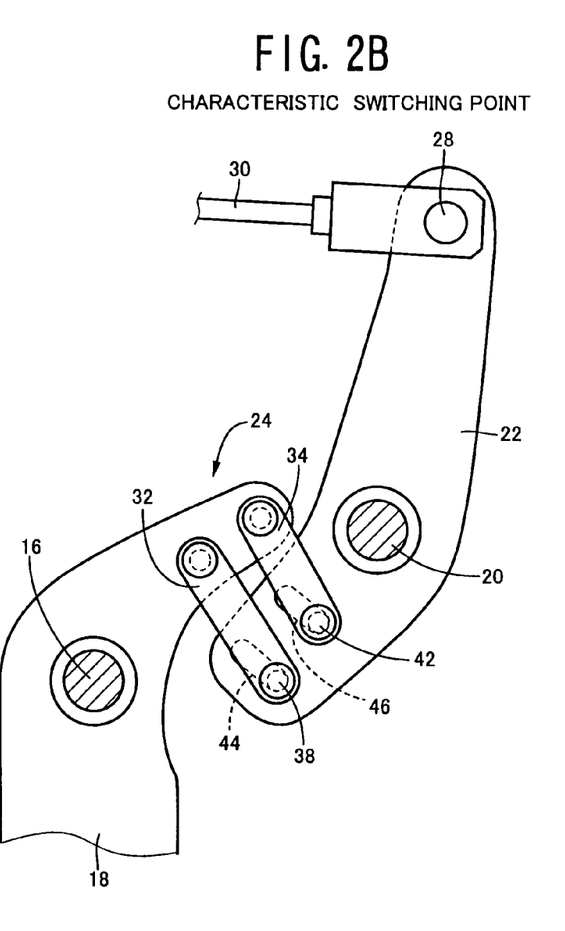
FIG. 2B shows a state in which the operating pedal is depressed to a characteristic switching point.

As shown in FIGS. 2A and 2B, the link mechanism 24 is equipped with a pair of first and second connecting links 32, 34 that are provided to bridge between an upper end portion of the operating pedal 18 and a lower end portion of the pivot member 22. Each of the first and second connecting links 32, 34 is provided by a pair of members that are disposed on opposite sides of the operating pedal 18 or pivot member 22 (on front and rear sides of drawing sheet of FIGS. 2A and 2B). The first and second connecting links 32, 34 are integrally connected at their longitudinally opposite end portions to the operating pedal 18 and the pivot member 22 through connecting pins 36, 38, 40, 42 that are parallel to the first and second support shafts 16, 20. The connecting pins 36, 40 connecting the first and second connecting links 32, 34 to the operating pedal 18 are pivotably received in respective holes formed in the operating pedal 18, so as to be connected to certain portions of the operating pedal 18. Meanwhile, the connecting pins 38, 42 connecting the first and second connecting links 32, 34 to the pivot member 22 are movably received in respective straight-linear-shaped elongated holes 44, 46 formed in the pivot member 22, so that certain play is provided by the elongated holes 44, 46.

The first and second connecting links 32, 34 are connected to the operating pedal 18 and the pivot member 22 at connected positions (positions of the connecting pins 36, 38, 40, 42) that are determined such that the first and second connecting links 32, 34 are parallel to each other in a state, as shown in FIG. 2A, in which the operating pedal 18 is in its initial position. The elongated holes 44, 46 are parallel to each other and have respective lengths such that, in the state of the initial position of the operating pedal 18, the elongated hole 44 overlaps with the first connecting link 32 while the elongated hole 46 is aligned with an extension of the second connecting link 34. In this state of the initial position, the connecting pin 38 is held in contact with an end portion of the elongated hole 44, and the pivot member 22 is biased clockwise about the second support shaft 20 by a biasing force of the rod 30, whereby the operating pedal 18 is biased counterclockwise about the first support shaft 16 through the first connecting link 32, so as to be held in the initial position. When the operating pedal 18 is depressed, the pivot member 22 is pivoted counterclockwise about the second support shaft 20 through the first connecting link 32 whereby the rod 30 is pressed leftward. The elongated hole 46 provided for the connection of the second connecting link 34 with the pivot member 22 provides certain play in a direction of the depressing operation of the operating pedal 18, i.e., in the counterclockwise direction about the second support shaft 20 in the state of initial position shown in FIG. 2A, so that the connecting pin 42 of the second connecting link 34 is merely moved within the elongated hole 46 until the operating pedal 18 reaches the characteristic switching point shown in FIG. 2B as a result of the depressing operation effected on the operating pedal 18.

Figure 3A:
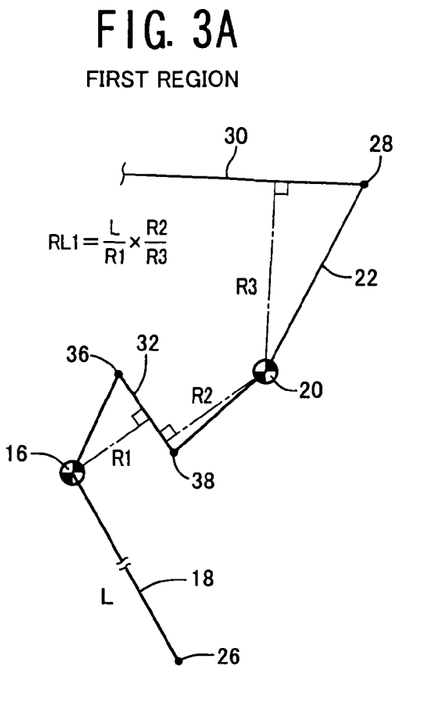
Figure 3B:
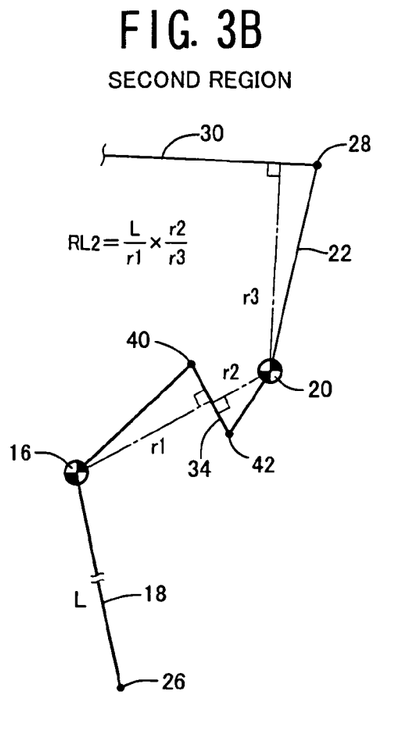
Figure 3C:
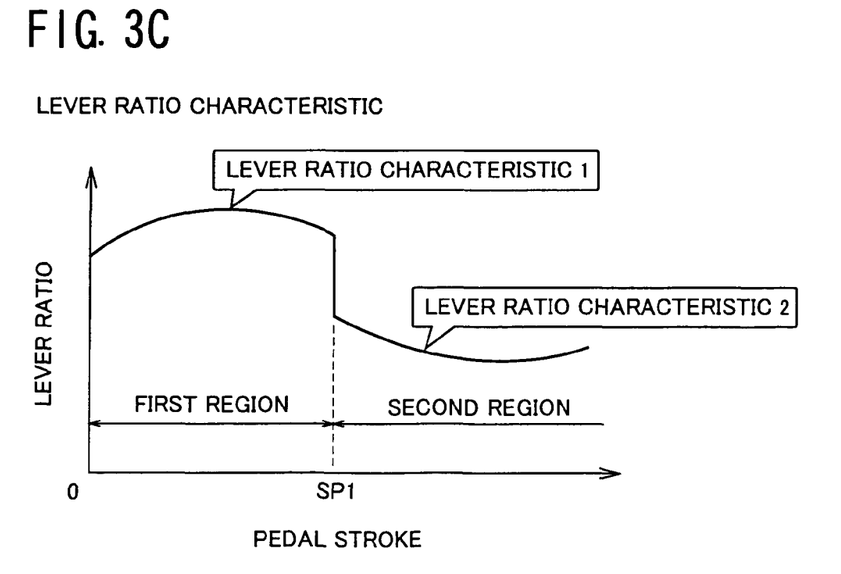
FIG. 3C shows an example of the lever ratio characteristic in the entirety of the pedal stroke.

Therefore, between the initial position shown in FIG. 2A and the characteristic switching point shown in FIG. 2B, a depression force applied to the operating pedal 18 is transmitted to the pivot member 22 through the first connecting link 32, while a lever ratio is changed according to a lever ratio characteristic 1 (first lever ratio characteristic) that is dependent on the connected positions in which the first connecting link 32 is connected to the operating pedal 18 and the pivot member 22. That is, as shown in FIG. 3C, in a first region in which the pedal stroke of the operating pedal 18 does not yet reach the characteristic switching point SP1, the depression force is transmitted by the first connecting link 32 while the lever ratio is changed according to the lever ratio characteristic 1. In this first region, the lever ratio RL1 is expressed by the following expression (1) where "L" represents a pedal arm length corresponding to a distance from the first support shaft 16 to the pedal pad 26, "R1" represents a moment length corresponding to a distance from the first support shaft 16 to the first connecting link 32, "R2" represents a moment length corresponding to a distance from the second support shaft 20 to the first connecting link 32, and "R3" represents a moment length corresponding to a distance from the second support shaft 20 to the rod 30, as shown in FIG. 3A. Thus, the lever ratio RL1 is continuously changed as the moment lengths R1, R2, R3 are changed in accordance with the pedal stroke. It is noted that the lever ratio characteristic 1 shown in FIG. 3C is merely an example and does not necessarily correspond to the lever ratio RL1 shown in FIG. 3A.

$$RL1=(L/R1)\times(R2/R3) \tag{1}$$

On the other hand, when the pedal stroke of the operating pedal 18 reaches the characteristic switching point shown in FIG. 2B, the connecting pin 42 of the second connecting link 34 is brought into contact with an end portion of the elongated hole 46 while the connecting pin 38 of the first connecting link 32 is separated from the above-described end portion of the elongated hole 44, so that the pivot member 22 comes to be pivoted counterclockwise about the second support shaft 20 through the second connecting link 34, whereby the rod 30 is pressed leftward by the pivot member 22. The elongated hole 44 provided for the connection of the first connecting link 32 with the pivot member 22 provides certain play in a direction opposite to the direction of the depressing operation of the operating pedal 18, i.e., in the clockwise direction about the second support shaft 20, so that the connecting pin 38 of the first connecting link 32 is merely moved within the elongated hole 44 when the operating pedal 18 is further depressed from the characteristic switching point in the state of the characteristic switching point shown in FIG. 2B. The elongated hole 44 is provided with a size sufficient to provide certain play between the hole 44 and the connecting pin 38 even where the operating pedal 18 is strongly depressed.

Therefore, beyond the characteristic switching point shown in FIG. 2B, the depression force applied to the operating pedal 18 is transmitted to the pivot member 22 through the second connecting link 34, while the lever ratio is changed according to a lever ratio characteristic 2 (second lever ratio characteristic) that is dependent on the connected positions in which the second connecting link 34 is connected to the operating pedal 18 and the pivot member 22. That is, as shown in FIG. 3C, in a second region in which the pedal stroke of the operating pedal 18 exceeds the characteristic switching point SP1, the depression force is transmitted by the second connecting link 34 while the lever ratio is changed according to the lever ratio characteristic 2. In this second region, the lever ratio RL2 is expressed by the following expression (2) where "L" represents the pedal arm length corresponding to the distance from the first support shaft 16 to the pedal pad 26, "r1" represents the moment length corresponding to the distance from the first support shaft 16 to the second connecting link 34, "r2" represents the moment length corresponding to the distance from the second support shaft 20 to the second connecting link 34, and "r3" represents the moment length corresponding to the distance from the second support shaft 20 to the rod 30, as shown in FIG. 3B. Thus, the lever ratio RL2 is continuously changed as the moment lengths r1, r2, r3 are changed in accordance with the pedal stroke. It is noted that the lever ratio characteristic 2 shown in FIG. 3C is merely an example and does not necessarily correspond to the lever ratio RL2 shown in FIG. 3B.

$$RL2=(L/r1)\times(r2/r3) \quad (2)$$

The lever ratio characteristics 1 and 2 can be set depending on the connected positions of the first and second connecting links 32, 34 (positions of the connecting pins 36, 38, 40, 42) and individually from each other. The characteristic switching point SP1, at which the lever ratio characteristic is switched from the lever ratio characteristic 1 to the lever ratio characteristic 2, can be suitably set by adjusting the connected positions of the first and second connecting links 32, 34 and the length of the elongated hole 46. In the present embodiment, the characteristic switching point SP1 is set such that the lever ratio characteristic is switched between the lever ratio characteristics 1 and 2 in an intermediate position of the pedal stroke during an ordinary braking operation.

Thus, in the brake pedal apparatus 10 of the present embodiment, the lever ratio characteristic in the first region and that in the second region can be set independently of each other, and the characteristic switching point SP1 as a boundary between the first and second regions can be suitably set. It is therefore possible to incontinuously and largely change the lever ratio at an arbitrary position (characteristic switching point SP1) of the pedal stroke, thereby improving a degree of freedom in setting of the lever ratio characteristic and providing a further excellent braking operation feeling.

Further, the depression force is transmitted from the operating pedal 18 to the pivot member 22 through the first connecting link 32 during the first region, and the depression force is transmitted from the operating pedal 18 to the pivot member 22 through the second connecting link 34 during the second region, so that there is no risk of considerable deterioration in efficiency of transmission of the depression force and durability of the brake pedal apparatus, which deterioration would be caused in the event of the stuck due to the offset arrangement as in the above-described Patent Document 2.

Further, in the present embodiment, the total of four connected positions at which the first and second connecting links 32, 34 are connected to the operating pedal 18 and the pivot member 22 are set individually from each other, so that the degree of freedom in setting of the lever ratio characteristics 1 and 2 is high.

Further, since the play is established by each of the elongated holes 44, 46, each of the first and second connecting links 32, 34 is relatively movable within a corresponding one of the elongated holes 44, 46. The lever ratio characteristic is switched between the lever ratio characteristics 1 and 2, when the connecting pin 42 of the second connecting link 34 reaches the end portion of the elongated hole 46. Thus, the switching of the lever ratio characteristic can be stably and smoothly made as the depressing operation of the operating pedal 18 is effected.

Figure 4:
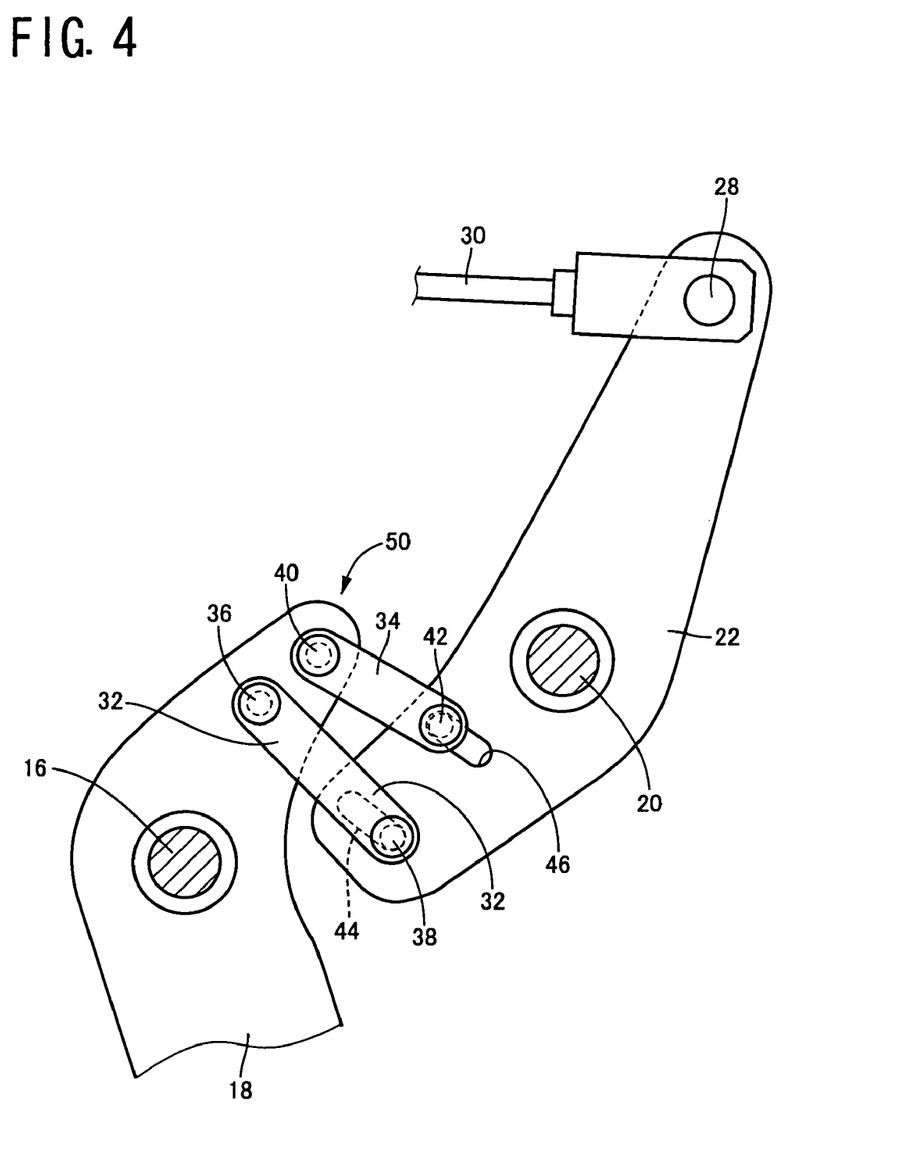
FIG. 4 is a view corresponding to FIG. 2A, explaining another embodiment of the present invention and showing in enlargement the link mechanism portion of the another embodiment while the operating pedal is in the initial position.

In the above-described embodiments, the connected positions at which the first and second connecting links 32, 34 are connected to the operating pedal 18 and the pivot member 22 are set such that the first and second connecting links 32, 34 are held in parallel to each other in the initial state. However, as in a link mechanism 50 shown in FIG. 4, the connected positions may be set such that the first and second connecting links 32, 34 are unparallel to each other in the initial state. Each of the elongated holes 44, 46 is elongated in a direction that may be determined such that each of the elongated holes 44, 46 provides certain play during the depressing operation of the operating pedal 18, namely, such that each of the elongated holes 44, 46 has a predetermined dimension as measured in a circumferential direction about a center in the form of the axis of the second support shaft 20.

Figure 5:
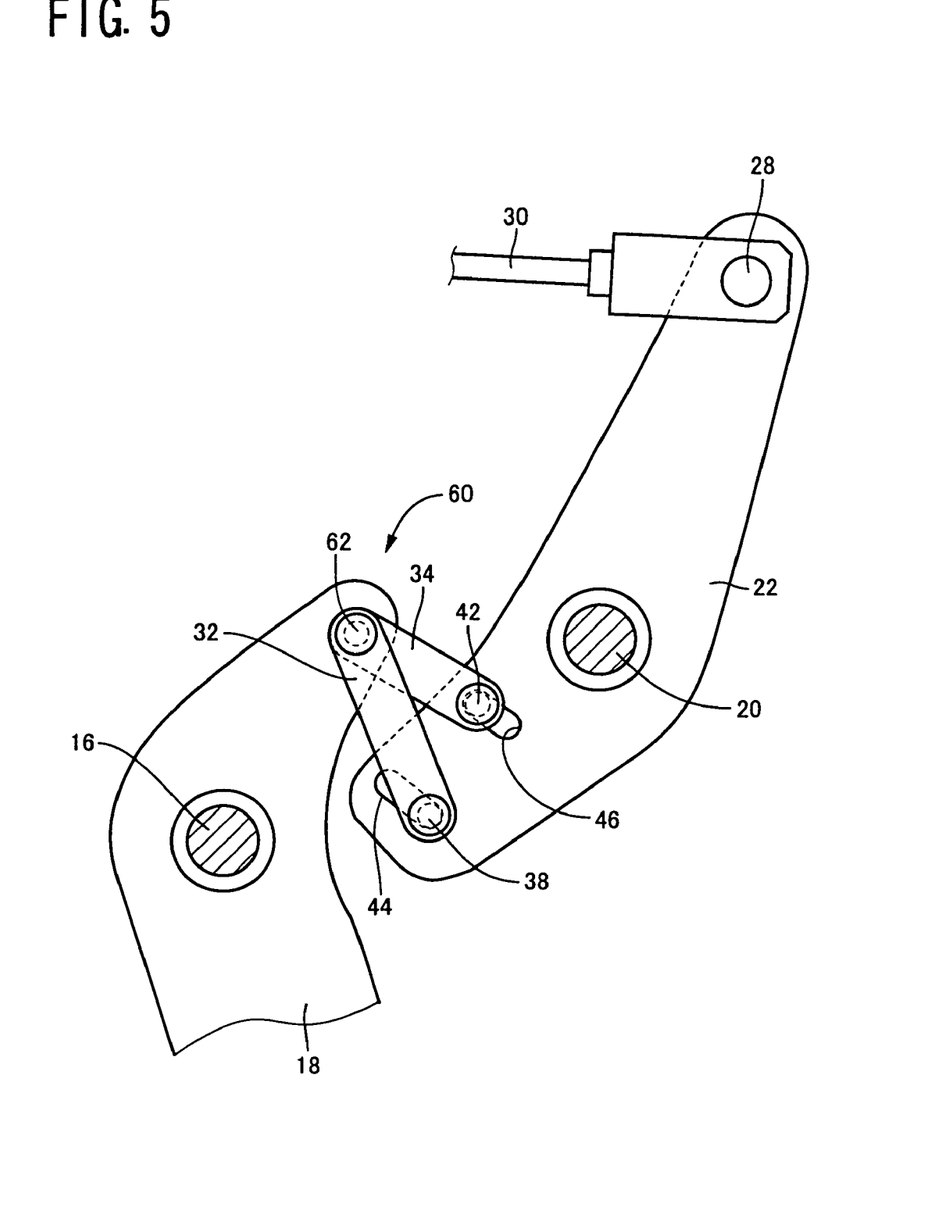
FIG. 5 is a view corresponding to FIG. 2A, explaining still another embodiment of the present invention and showing in enlargement the link mechanism portion of the still another embodiment while the operating pedal is in the initial position.

In the above-described embodiments, the total of four connected positions at which the first and second connecting links 32, 34 are connected to the operating pedal 18 and the pivot member 22 are different from each other. However, as in a link mechanism 60 shown in FIG. 5, the operating pedal 18 may have a common connecting portion that provides both the connecting portions of the operating pedal 18 at which the operating pedal 18 is connected to end portions of the respective first and second connecting links 32, 34 that are located on the side of the operating pedal 18, through a single connecting pin 62.

Figure 6A:
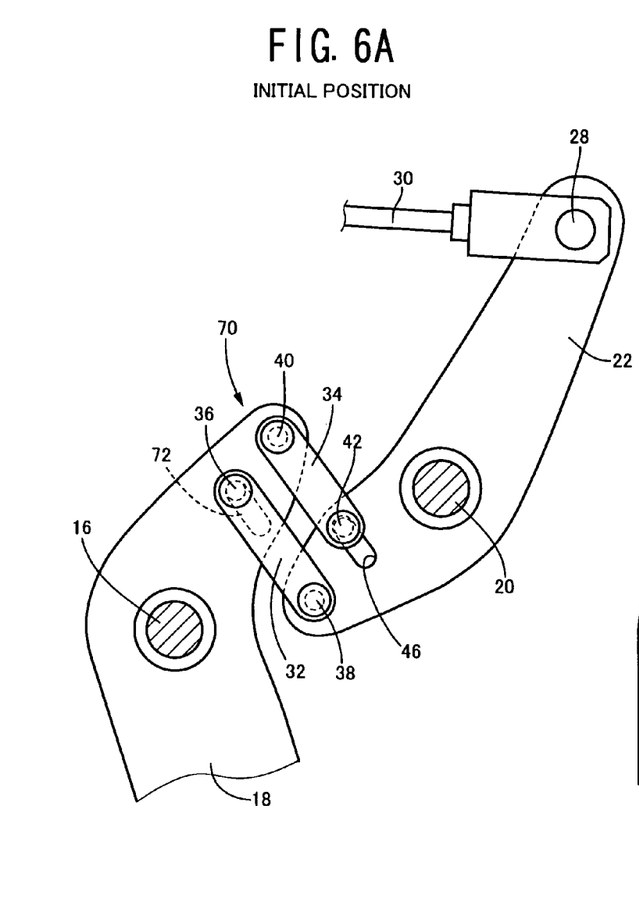
FIGS. 6A and 6B are views corresponding to the views of FIGS. 2A and 2B, and explaining still another embodiment of the present invention.
Figure 6B:
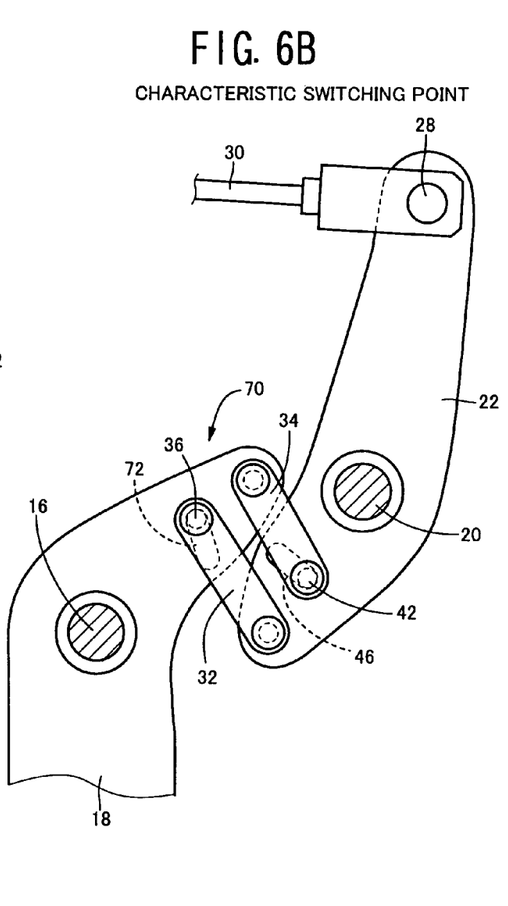

In the above-described embodiments, the elongated hole 44 is provided in the pivot member 22. However, as in a link mechanism 70 shown in FIGS. 6A and 6B, an elongated hole 72 may be provided in the operating pedal 18, such that the connecting pin 36 of the first connecting link 32 is connected to the operating pedal 18 with certain play existing between the first connecting link 32 and the operating pedal 18, while the connecting pin 38 of the first connecting link 32 is connected to a certain portion of the pivot member 22. Similarly, the elongated hole 46 provided for the connection of the second connecting link 34 may be provided in the operating pedal 18 rather than in the pivot member 22. Further, such elongated holes may be provided in both of the operating pedal 18 and the pivot member 22.

The embodiments of the present invention have been described in detail with reference to the drawings. However, the described embodiments are merely embodied forms, and the present invention can be embodied with various modifications and improvements on the basis of knowledge of those skilled in the art.

The invention claimed is:

1. A brake pedal apparatus comprising:

an operating pedal which is disposed pivotably about a first axis;

a pivot member which is disposed pivotably about a second axis parallel to the first axis, and which is connected to the operating pedal via a link mechanism so as to be mechanically pivoted about the second axis in response to a depressing operation effected on the operating pedal, an output member which is to receive an output generated by pivot motion of the pivot member; and the link mechanism including (i) a first connecting link connecting the operating pedal and the pivot member with first play existing between the first connecting link and at least one of the operating pedal and the pivot member, the first play being provided in a first side which is opposite to a side of the first connecting link to be engaged with at least one of the operating pedal and the pivot member when the operating pedal is depressed from the initial position of the operating pedal, and (ii) a second connecting link connecting the operating pedal and the pivot member with second play existing between the second connecting link and at least one of the operating pedal and the pivot member, the second play being provided in a second side which is the same as a side of the second connecting link to be engaged with at least one of the operating pedal and the pivot member when the operating pedal is depressed from the initial position of the operating pedal, wherein, in a first region before a characteristic switching point of a pedal stroke of the operating pedal, the pivot member is pivoted through the first connecting link, while a lever ratio is changed according to a first lever ratio characteristic that is dependent on connected positions in which the first connecting link is connected to the operating pedal and the pivot member, and wherein, in a second region beyond the characteristic switching point of the pedal stroke, the pivot member is pivoted through the second connecting link, while the lever ratio is changed according to a second lever ratio characteristic that is dependent on connected positions in which the second connecting link is connected to the operating pedal and the pivot member.

2. The brake pedal apparatus according to claim 1, wherein the first connecting link is connected to a first connected position of the operating pedal, and to a first connected position of the pivot member, wherein the second connecting link is connected to a second connected position of the operating pedal that is spaced apart from the first connected position of the operating pedal, and to a second connected position of the pivot member that is spaced apart from the first connected position of the pivot member, wherein one of connections of the first connecting link with the first connected position of the operating pedal and with the first connected position of the pivot member is made through engagement of a first connecting pin with a first elongated hole receiving therein the first connecting pin, so as to establish the first play, the first connecting pin being provided in one of the first connecting link and the operating pedal, the first elongated hole being provided in the other of the first connecting link and the operating pedal, wherein one of connections of the second connecting link with the second connected position of the operating pedal and with the second connected position of the pivot member is made through engagement of a second connecting pin with a second elongated hole receiving therein the second connecting pin, so as to establish the second play, the second connecting pin being provided in one of the second connecting link and the operating pedal, the second elongated hole being provided in the other of the second connecting link and the operating pedal, and wherein at least one or both of the first elongated hole and the second elongated hole are provided on the pivot member.

3. The brake pedal apparatus according to claim 2, wherein a distance between the first connected position of the operating pedal and the first axis is smaller than a distance between the second connected position of the operating pedal and the first axis, and wherein a distance between the second connected position of the pivot member and the second axis is smaller than a distance between the first connected position of the pivot member and the second axis.

4. The brake pedal apparatus according to claim 2, wherein the output member receives one of a pressing force and a tensile force as the output generated upon the pivot motion of the pivot member.

5. The brake pedal apparatus according to claim 1, wherein the first connecting link is connected to a first connected position of the operating pedal, and to a first connected position of the pivot member, wherein the second connecting link is connected to a second connected position of the operating pedal, and to a second connected position of the pivot member, wherein one of the operating pedal and the pivot member has a common connected position which provides both of the first and second connected positions of the one of the operating pedal and the pivot member, wherein the other of the operating pedal and the pivot member has two connected positions which are spaced apart from each other and which provide the respective first and second connected positions of the other of the operating pedal and the pivot member, wherein one of connections of the first connecting link with the first connected position of the operating pedal and with the first connected position of the pivot member is made through engagement of a first connecting pin with a first elongated hole receiving therein the first connecting pin, so as to establish the first play, the first connecting pin being provided in one of the first connecting link and the operating pedal, the first elongated hole being provided in the other of the first connecting link and the operating pedal, and wherein one of connections of the second connecting link with the second connected position of the operating pedal and with the second connected position of the pivot member is made through engagement of a second connecting pin with a second elongated hole receiving therein the second connecting pin, so as to establish the second play, the second connecting pin being provided in one of the second connecting link and the operating pedal, the second elongated hole being provided in the other of the second connecting link and the operating pedal.

6. The brake pedal apparatus according to claim 5, wherein the operating pedal has the common connected position which provides both of the first and second connected positions of the operating pedal, wherein the pivot member has the two connected positions which are spaced apart from each other and which provide the respective first and second connected positions of the pivot member, and wherein a distance between the second connected position of the pivot member and the second axis is smaller than a distance between the first connected position of the pivot member and the second axis.

7. The brake pedal apparatus according to claim 1, wherein the first connecting link is connected to a first connected position of the operating pedal, and to a first connected position of the pivot member, wherein the second connecting link is connected to a second connected position of the operating pedal that is spaced apart from the first connected position of the operating pedal, and to a second connected position of the pivot member that is spaced apart from the first connected position of the pivot member, wherein a distance between the first connected position of the operating pedal and the first axis is smaller than a distance between the second connected position of the operating pedal and the first axis, and wherein a distance between the second connected position of the pivot member and the second axis is smaller than a distance between the first connected position of the pivot member and the second axis.

8. The brake pedal apparatus according to claim 1, wherein the first connecting link is connected to a first connected position of the operating pedal, and to a first connected position of the pivot member, wherein the second connecting link is connected to a second connected position of the operating pedal, and to a second connected position of the pivot member, wherein the operating pedal has a common connected position which provides both of the first and second connected positions of the operating pedal, wherein the pivot member has two connected positions which are spaced apart from each other and which provide the respective first and second connected positions of the pivot member, and wherein a distance between the second connected position of the pivot member and the second axis is smaller than a distance between the first connected position of the pivot member and the second axis.

9. The brake pedal apparatus according to claim 1, wherein the output member receives one of a pressing force and a tensile force as the output generated upon the pivot motion of the pivot member.

* * * * *